No. 637,199. Patented Nov. 14, 1899.
H. FENNELL.
EYEGLASSES.
(Application filed Aug. 8, 1899.)

(No Model.)

WITNESSES.
A. D. Grover.
J. Murphy.

INVENTOR.
Harry Fennell
By Jas. H. Churchill
Atty.

THE NORRIS PETERS CO., PHOTO-LITHO., WASHINGTON, D. C.

UNITED STATES PATENT OFFICE.

HARRY FENNELL, OF EVERETT, MASSACHUSETTS, ASSIGNOR OF ONE-HALF TO ARTHUR A. GLEASON, OF SAME PLACE.

EYEGLASSES.

SPECIFICATION forming part of Letters Patent No. 637,199, dated November 14, 1899.

Application filed August 8, 1899. Serial No. 726,556. (No model.)

*To all whom it may concern:*

Be it known that I, HARRY FENNELL, a citizen of the United States, residing in Everett, in the county of Middlesex and State of Massachusetts, have invented an Improvement in Eyeglasses, of which the following description, in connection with the accompanying drawings, is a specification, like letters and numerals on the drawings representing like parts.

This invention relates to frameless eyeglasses or spectacles, and has for its object to provide a locking device for the screw employed to secure the lens to the clasp or setting whereby the said screw is firmly locked against rotation and loosening of the setting or clasp by the frequent handling of the eyeglasses or spectacles is avoided. For this purpose I employ a screw having an angular portion or collar on its stem or shank which is embraced by a locking device or piece, suitably secured to the setting or clasp against rotation. These and other features of this invention will be pointed out in the claim at the end of this specification.

Figure 1:
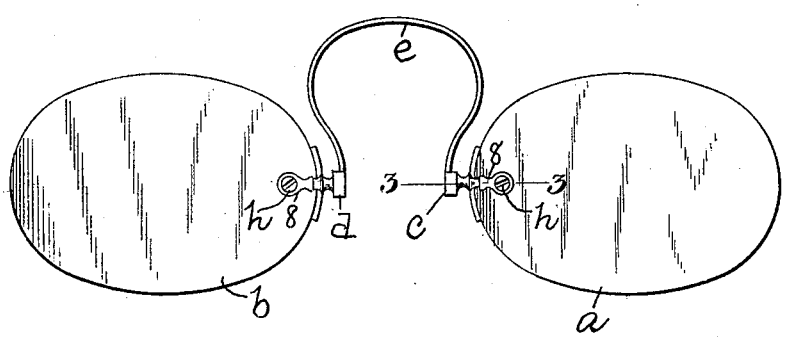
Figure 2:
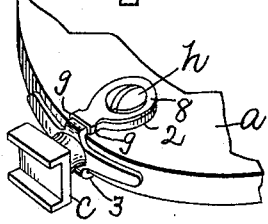
Figure 3:
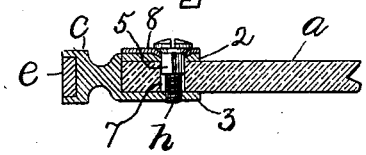

Figure 1 represents in elevation a pair of spectacles embodying this invention; Fig. 2, a detail in perspective and on an enlarged scale to be referred to; Fig. 3, a section on the line 3 3, Fig. 1, on an enlarged scale; and Fig. 4, a detail to be referred to.

The lenses *a b*, the settings or clasps *c d*, and spring *e* are and may be of usual construction, such as now commonly found in eyeglasses. The lenses *a b* are fastened to their settings or clasps *c d* by screws *h*, and the said screws are locked against rotation by suitable devices, as will be described.

The clasps or fittings *c d* are of like construction and, as herein shown, are each provided with forks or arms 2 3, which straddle the lens coöperating with them.

Figure 4:
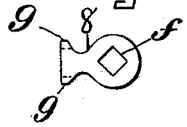

Each screw *h*, in accordance with this invention, has its shank provided with an angular portion 5, which, as shown, is enlarged to form a collar on said shank, the latter being provided below the said collar with the usual screw-threads which engage a screw-threaded socket or opening in the fork 3, the said shank passing through the usual hole 7 in the lens. The angular portion of the shank has coöperating with it a locking device, which may be made as shown in Fig. 4, the function of which is to restrain the screw from rotating in a reverse direction, and thereby prevent the lens from becoming loose in its setting or clasp. In the present instance the locking device is shown as a thin piece or strip 8 of metal provided with a square hole *f*, which embraces the angular portion or collar 5 on the shank of the screw, the said locking device being interposed between the head of the screw and the fork or arm 2. The locking device is suitably secured to or connected with the clasp or setting, so as to restrain it and the screw from rotating when the parts are in their operative position, (shown in Figs. 1, 2, and 3,) and this result may and preferably will be effected, as herein shown, by bending down the front portion of the piece or strip 8 on opposite sides of the fork or arm 2, the said bent portions forming fingers *g*, which embrace the fork or arm 2, and thus secure the locking device to the setting or clasp. This manner of securing the locking device to the setting is preferred by me, as it forms a readily-detachable connection between the said device and the setting and enables the parts to be readily taken apart in case it is desired to make repairs or for other purposes; but I do not desire to limit my invention in this respect. The fingers *g* are normally in the same plane as the rest of the strip, which enables the screw *h* to be turned when the parts are being assembled.

The lens is secured to the clasp herein shown in the following manner: The lens is inserted between the forks 2 3 of the clasp with the hole 7 in line with the screw-holes in the said forks. The locking device is fitted over the angular portion or collar 5 on the screw *h* with the fingers *g* in the same plane, and the screw is then inserted through the hole in the fork 2 and into the threaded hole in the fork 3, and is then turned until it occupies the position shown in Fig. 3. The fingers *g* are then bent over the sides of the fork 2, which secures the locking device to the clasp, and thus locks the screw from turning in a reverse direction.

I claim—

The combination with a lens, a setting or clasp for the same provided with forks or arms which embrace said lens, a screw extended through said forks or arms and said lens, and provided with an angular portion below its head, of a locking device having an angular opening through which said angular portion of the screw extends and provided with fingers to engage the setting, substantially as and for the purpose specified.

In testimony whereof I have signed my name to this specification in the presence of two subscribing witnesses.

HARRY FENNELL.

Witnesses:
JAS. H. CHURCHILL,
J. MURPHY.